No. 705,050. Patented July 22, 1902.
O. E. EATON & F. C. BURRILL.
COMPASS LIGHT.
(Application filed Feb. 20, 1902.)
(No Model.)
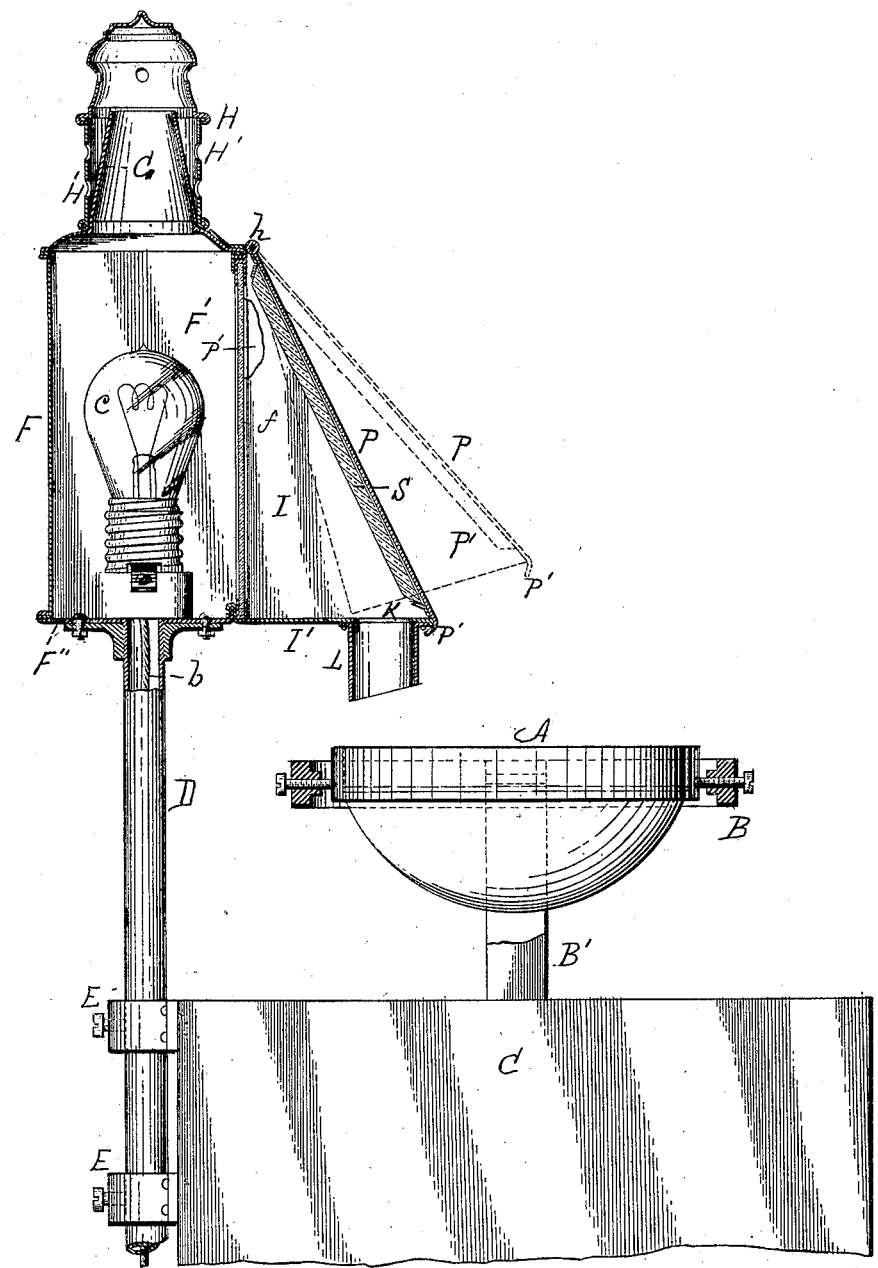
WITNESSES:
A. M. Ponney
A. K. Hood
INVENTORS:
Oscar E. Eaton,
Frank C. Burrill,
By their Atty. Henry W. Williams.

UNITED STATES PATENT OFFICE.

OSCAR E. EATON, OF BOSTON, AND FRANK C. BURRILL, OF HULL, MASSACHUSETTS.

COMPASS-LIGHT.

SPECIFICATION forming part of Letters Patent No. 705,050, dated July 22, 1902.

Application filed February 20, 1902. Serial No. 94,908. (No model.)

*To all whom it may concern:*

Be it known that we, OSCAR E. EATON, residing in Boston, in the county of Suffolk, and FRANK C. BURRILL, residing in Hull, in the county of Plymouth, State of Massachusetts, citizens of the United States, have invented new and useful Improvements in Compass-Lights, of which the following is a specification.

Compasses as ordinarily constructed have when in use their entire faces or surfaces open to view, so that all points of the compass are in sight. When such compasses are used at night, a light is thrown upon them and the entire compass is exposed to the light, so that there is a considerable glare. The effect is that as a helmsman looks off from the compass into the darkness he is at the moment of looking apt to be what is termed "compass-blind," for the reason that it takes a little time for the eyes to become accustomed to the change produced by looking from a surface as large as a compass, reflecting the glare of a bright light, into the darkness of the night and to distant points.

In our invention we provide a compass-light which will illuminate only that portion of the compass which it is necessary for the steersman to see. The only portion which need be in sight is that point next the lubber's point or the line indicating the course in which the vessel is steering and a few points each side thereof in order to make allowance for the variations of the ship on her course. Thus as a small portion only of the compass is illuminated there is little or no glare and practically the compass-blindness referred to is done away with. Moreover, by means of our device no binnacle is needed and the compass is always open to view. Provision is made also whereby the entire face of the compass may be illuminated, if desired, for the purpose of getting a "cross-bearing" or for lighting temporarily the wheelhouse.

The nature of the invention is fully described below and illustrated in the accompanying drawing, which shows a vertical section taken through our improved compass-light and through the frame of a compass in proper relative position thereto, the compass and the support thereof and the lantern being shown in elevation.

A represents a compass supported by a suitable frame B B', extending up from a base C. D is a standard adjustably supported in suitable ears or sockets E, extending from the base C, said standard being preferably tubular in order to contain an electric wire $b$, leading to an electric light $c$ within the lamp. Of course any style of lamp or light may be substituted for the electric light.

The lantern comprises a case, preferably metallic and consisting of the rear wall F, side walls F', bottom F'', transparent front window $f$, and chimney G, opening into a cap H, suitably perforated at H', such chimney and cap being for use in case an oil-lamp is employed. The side walls F' are provided with parallel extensions I, triangular in shape, as shown, and connected at their bottoms by the horizontal plate I', which is provided with an aperture K. From this aperture extends downward a tube L, which is preferably elliptical in shape and corresponds in shape and size with the aperture and has its lower end cut on a bevel, so that the rear portion of its wall is somewhat longer than the front portion. We do not, however, regard it as absolutely necessary to the invention that the wall of this tube should be beveled or that the tube should be elliptical in shape, but we prefer this construction. Hinged at $h$ to the top of the main body of the lantern is a cover, which consists of the flat metallic plate P, connected by rearwardly-extending triangular side plates P', (the shape of which is indicated by dotted lines,) and which is formed with an inwardly-turned lip P'' at its lower end. The side plates P' and the lip P'' are for the purpose of preventing any light from escaping from the lantern at those points, and the side plates are furthermore for the purpose of guiding the cover as it swings up and down. The inner surface of the portion P of the cover is provided with a reflector S.

The normal condition of the lantern is illustrated in full lines—that is, with the cover closed. Its position with relation to the compass is such that the tube L is directly over a portion of the compass next its edge. This is the portion which it is necessary that the helmsman should see, as it is the portion next and on opposite sides of the lubber's point or the line indicating the steering course of the vessel. While this illuminated space is large enough to allow for the falling off or swerving of the vessel from the point toward which she is steering, it is comparatively a small portion of the compass. The remainder of the compass is not lighted up, and hence there is no reflection or glare from any part except the small portion illuminated. In daylight the whole compass is in sight, and no binnacle is required. In steering in the night there is not sufficient glare from the illuminated portion of the compass to render the helmsman compass-blind when he looks off therefrom into the darkness. Should it be desired to get a cross-bearing, the cover P P' is swung up, as indicated in dotted lines, and the entire face of the compass is illuminated. This can also be done if it is desired to light up the room or to take notes or for any purpose to examine the entire face of the compass.

Having thus fully described our invention, what we claim, and desire to secure by Letters Patent, is—

1. In a compass-light, in combination with a compass; a lantern comprising a case and a cover swinging therefrom and adapted to close or open an opening sufficiently large to allow the light to illuminate the entire compass, said lantern being provided with a smaller aperture adapted to allow a small portion only of the compass to be illuminated, the lantern being so set with relation to the compass as to allow the light to be constantly shed thereon through the small aperture, substantially as set forth.

2. In a compass-light, in combination with a compass; a lantern comprising a case and a cover swinging therefrom and adapted to open or close an aperture large enough to allow the light to illuminate the entire compass, said lantern being provided with a smaller aperture adapted to allow only a limited portion of the compass to be illuminated; and a tube extending down from said aperture whereby the light is guided and confined to a limited portion of the surface of the compass, substantially as described.

In testimony whereof we have signed our names to this specification in the presence of two subscribing witnesses.

OSCAR E. EATON.
FRANK C. BURRILL.

Witnesses:
HENRY W. WILLIAMS,
A. N. BONNEY.